2,977,586
Patented Mar. 28, 1961

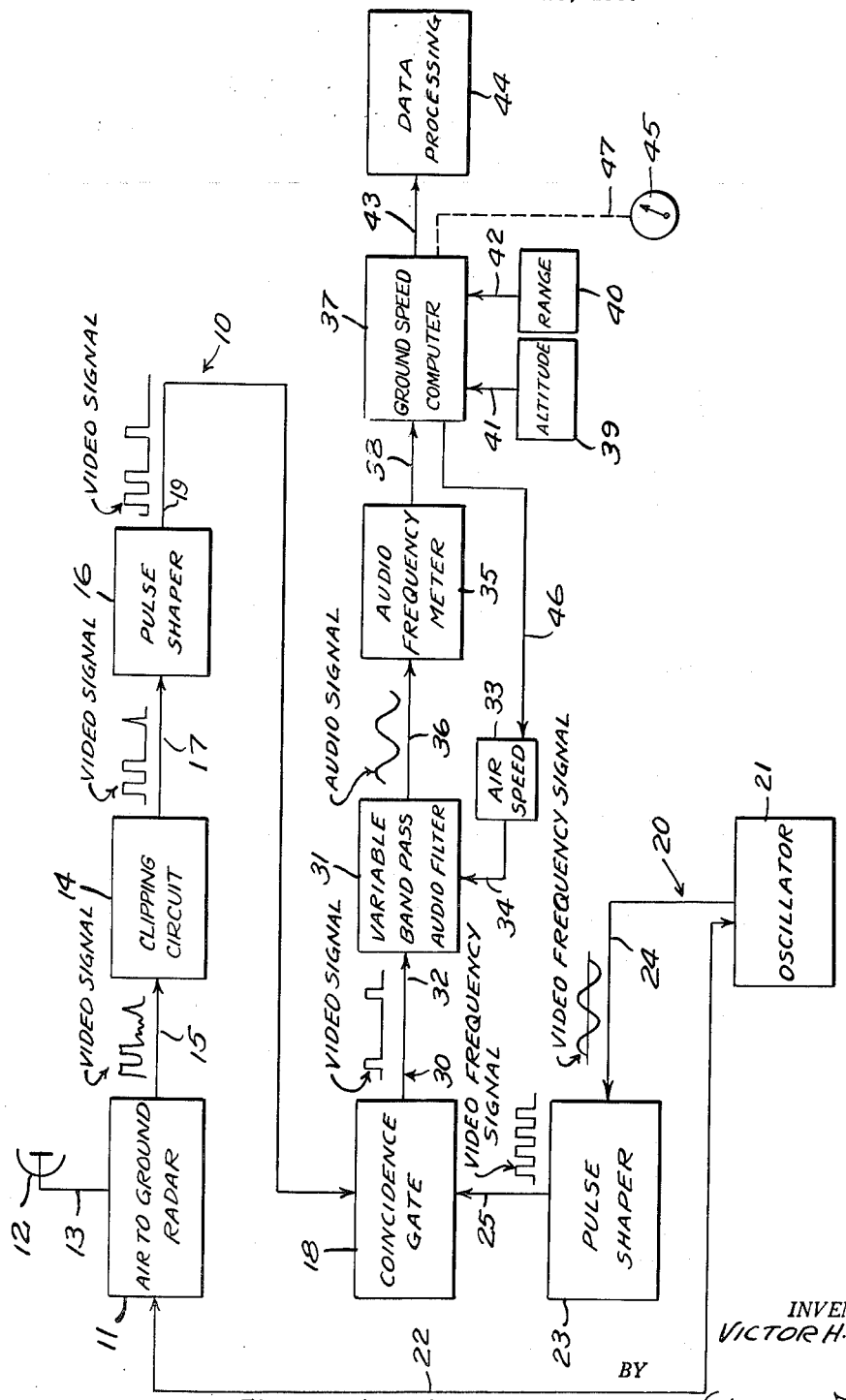

2,977,586
GROUND SPEED INDICATOR

Victor H. Seliger, Kew Gardens, N.Y., assignor to The Sperry Rand Corporation, Ford Instrument Company, Division, Long Island City, N.Y., a corporation of Delaware Filed Mar. 26, 1957, Ser. No. 648,664

5 Claims. (Cl. 343—8)

This invention relates to aircraft speed indicators and particularly to airborne radar equipment means for indicating the aircraft ground speed.

The reliance upon air speed indicators for ground speed determinations has limitations when a high degree of accuracy is required. The embodiment of radar principles in electronic circuits eliminates the dependance upon prevailing wind data which are normally used to correct conventional air speed indicators and thereby provides a system with greater inherent accuracy.

When an air-to-ground radar is operated in flight, a general motion of the forward ground return toward the sweep origin is presented on the radar indicator. This relative motion of the video return is due to the motion of the aircraft towards the forward ground points being observed.

In cases where isolated radar targets are present to reflect reliably and strongly the transmitted radar pulses, the radar operator can determine aircraft ground speed by observing the time interval required for a given target return to cross between two fixed radar range marks. The range difference between the range marks, divided by the observed time to cross between marks, is the target slant range rate $dR_s/dt$, wherein $R_s$ is the slant range. If the target is along the ground track, the ground speed $V_g$ can be derived from the formula:

$$V_g = \frac{dR_s}{dt} \sec \gamma$$

where $\gamma$ is the depression angle of the ground target from the aircraft. For targets lying to one side of the ground track, a more complex formula relates the ground speed $V_g$ to the rate of change of slant range $dR_s/dt$.

A principal object of this invention is to provide a new system for accurately and continuously indicating aircraft ground speed data from associated equipment operating in conjunction with airborne radar equipment.

In general, this invention contemplates a radar device in an aircraft providing a video output corresponding to the ground reflections. This signal is impressed upon a clipping circuit to provide well defined pulses corresponding to the most significant portions of the ground return. These pulses are then applied to a pulse shaping circuit which forms corresponding pulses of shape better adapted to the scanning process. The output of the pulse shaping circuit is applied as one input to a coincidence gate circuit. The second input to the coincidence circuit is a periodic train of rectangular pulses generated by a calibrated high-frequency oscillator through a second pulse shaping circuit.

By adjusting the frequency $f_s$ of the oscillator so that the repetition rate, $1/f_s$, is considerably less than the time $t_1$ where $t_1$ is obtained by dividing twice the maximum radar slant range by the velocity of propagation of the radar waves. In practice the period $1/f_s$ equal to $\frac{1}{20}$ of $t_1$ was used. The pulse width of the video signal in the output of the pulse shaper 16 should also be considerably less than the time $t_1$ and a value equal to about ½ the frequency $f_s$ is a preferred upper limit therefor. The output of the coincidence gate will consist of pulses corresponding to the output pulses of the radar video channel pulse shaper with the deletion of the portions of the video pulse train which occur when the coincidence gate is closed by the oscillator. When the sweep cycle of the radar channel is synchronized with the oscillator, the timing of the radar channel pulses continuously changes at a rate related to the slant range rate.

Since the frequency spectrum of the output of the coincidence gate therefore contains a frequency component proportional to the range rate, a frequency sensitive device can quantitatively isolate and linearly respond to the aircraft ground speed when corrections are made for altitude and range. The electrical output of this frequency sensitive device may be employed to control conventional systems for automatic processing of ground-speed.

The features of the invention will be understood more clearly from the following detailed description taken in conjunction with the accompanying drawing in which the drawing is a block diagram with accompanying signal patterns of a new ground speed indicating system employing electronic and radar circuitry.

Referring to the ground-speed indicator illustrated in the drawing, a radar video channel 10 includes an air-to-ground radar device 11 having a scanning antenna 12 connected to the radar device by an R.F. channel 13. The video output of the radar device 11 is connected to an upper and lower pulse level clipping circuit 14 by a cable 15 so as to provide at the output of 14 well-defined pulses corresponding to the most significant portions of the ground return. The video output of the clipping circuit 14 is connected to a pulse shaper 16 by a cable 17 to form at the output of 16 corresponding pulses having a shape better adapted to the subsequent scanning process. The output of the pulse shaper 16 is connected to one input of a coincidence gate network 18 by a cable 19.

A channel 20 includes an oscillator 21 having a frequency higher than the sweep frequency of the radar device 11, the oscillator 21 being synchronized with the timing circuits in the radar device 11 through a synchronizing cable 22. The video frequency output of the oscillator 21 is connected to a pulse shaper 23 by a cable 24 to generate rectangular signal pulses at the output of 23. The video frequency output of the pulse shaper 23 is connected to a second input of the coincidence gate network 18 by a cable 25.

Since the frequency of the oscillator 21 is properly related to the time constants of the clipping circuit 14 and the pulse shapers 16 and 23, the video signal in a ground-speed channel 30 connected to the output of the coincidence gate 18 will consist of pulses corresponding to the output pulses of the radar video channel 10 except for the pulses which are deleted by the coincidence gate 18. Any video signal pulses, or portions thereof, in the radar video channel 10, which are applied to the coincidence gate network 18 when the gate is opened by a simultaneous pulse from the channel 20 of the polarity required to open the gate will pass to the ground-speed channel 30. When the polarity of the pulse from the channel 20 has a polarity such as to close or block the coincidence gate 18, the video signal, or portion thereof, during that pulse interval will not pass to the ground-speed channel 30. As a consequence of the synchronization of the oscillator in the radar device 11 with the oscillator 21, the output of the coincidence gate when the aircraft has zero speed would consist of identical trains of partially deleted radar return pulses for successive repetitions of the radar sweep cycle. When the aircraft is moving relative to the ground, the timing of the radar channel pulses with respect to the pulses in the oscillator channel 24 continuously changes at a rate related to the ground speed. The frequency spectrum of the coincidence gate output in the channel 30 therefore contains a frequency component proportional to the slant range rate from which the aircraft ground-speed can be determined. That the frequency spectrum of the coincidence gate contains a frequency component proportional to slant range rate may be explained by analogy to an optical system in which two gratings, for example, are juxtaposed and mounted so that one moves relative to the other with each grating having alternate parallel, opaque and transparent strips. It is known that the amount of light transmitted by the gratings will depend upon the relative alignment of the transparent strips. If the light transmitted through the gratings is allowed to fall on a photometer, the output of the latter will continuously vary between zero and maximum and the fundamental frequency of the light variation in the photometer output will vary proportionately to the velocity of relative grating motion and inversely with the width of the opaque and transparent grating strips. The scanning principle employed in the instant system is analogous to the principle used in the optical system which yields the described optical effect, except that the moving grating is replaced by pulses in the video signal channel 10 and derived from the moving ground return and the stationary grating is replaced by the coincidence gate 18; further the "motion" involved consists of the continuously changing time position of the radar return pulses with respect to the reference pulses generated by the oscillator 21. Just as the frequency of the photometer output is related to the motion of the moving grating, a frequency component in the output of the coincidence gate is obtained which is a function of the rate of frequency change in the radar return as determined by the slant range rate.

If the radar beam is directed on the ground track, the frequency, $f$, of coincidence gate output which is related to the ground-speed $V_g$ is given by:

$$f = \frac{\frac{dR_s}{dt} \cdot k \cdot f_s}{3600}$$

wherein, $f_s$ is the scanning oscillator frequency in megacycles per second, $k$ is a constant equal to 12.36 microseconds per radar mile, $dR_s/dt$ is the slant range rate in knots and $f$ is the output frequency in the channel 30, in cycles per second.

An application of this formula will indicate an output frequency component of 20.6 cycles per second in the ground speed channel 30 for a ground speed of 600 knots when the scanning oscillator frequency as determined by the calibrated oscillator 21 is 10 megacycles per second.

The ground speed channel 30 includes a variable band pass audio filter 31 connected to the output of the coincidence gate 18 by a cable 32. For a slant range rate range of 437 to 728 knots and a sweep frequency of 10 megacycles, the band pass audio filter 31 is adjusted for a range of 15 to 25 cycles per second and unwanted frequencies and harmonics yielding false ground speeds are thereby eliminated. When the slant range rate of the aircraft falls below the range of 437 to 728 knots as determined by a conventional air speed indicator, corrected for depression angle, the band pass audio filter 31 can be adjusted to a range 5 to 15 cycles to cover the aircraft ground speed range of 145 to 437 knots. This adjustment of the band pass filter can be accomplished in an automatic manner, with information pulses from a corrected air-speed indicator 33 controlling the center-point frequency of the band pass frequency range of the filter 31 through a cable 34 in a conventional manner. Corrections of the air-speed indicator for depression angle is made through cable 46 from a computer to be described hereinafter. The output of the band pass audio filter 31 is connected to an audio frequency meter 35 by a cable 36 and the output of this frequency sensitive device is directly proportional to the aircraft slant range rate.

With the aircraft in flight at normal altitudes, the output from the audio frequency meter 35 is directly proportional to the rate of change of slant range and not the true ground speed. In order to secure true ground speed data, a ground speed computer 37 is connected to the output of the audio frequency meter 35 by a cable 38. The ground speed computer 37 computes the relation between slant range rate and true ground speed according to the formula:

$$V_g = \frac{dR_s}{dt} \frac{R_s}{\sqrt{R_s^2 - H^2}}$$

wherein, $dR_s/dt$ is the slant range rate, this velocity being directly proportional to the output from the audio frequency meter 35, $R_s$ is the slant range and $H$ is the aircraft altitude.

The quantity $$\frac{R_s}{\sqrt{R_s^2 - H^2}}$$

is also used to provide an approximate correction to the air-speed indicator 33, through cable 46. This correction is such as to make $$V_A' \cong V_A \frac{\sqrt{R_s^2 - H^2}}{R_s}$$

wherein $V_A$ is the air-speed measured before correction, and $V_A'$ is the corrected air-speed measurement.

For automatic operation, an altimeter 39 and a range device 40 can control the desired informational inputs to the ground speed computer 37 by cables 41 and 42 respectively in a conventional manner.

The output of the ground speed computer 37 in the cable 43 can be used to supply true ground speed to an information processing device 44. Also the true ground speed can be read on a dial 45 which is mechanically driven by an output shaft 47 of the computer 37.

It is to be understood that various modifications by persons skilled in the art without departing from the principle and scope of the invention as defined in the appended claims.

What is claimed is:

1. In an aircraft ground speed indicator, slant range measuring means comprising a radar system, an oscillator in synchronized connection with said radar system and which is adapted to generate reference pulses to its output, a coincidence gate which is connected to receive the outputs of said radar system and said oscillator, a clipping circuit which is connected between said radar system and said coincidence gate, a first pulse shaper which is connected between said clipping circuit and said coincidence gate, a second pulse shaper which is connected between said coincidence gate and said oscillator, and a frequency measuring means which is connected to said coincidence gate and wherein the frequency component directly related to the aircraft slant range rate is detected.

2. In an aircraft ground speed indicator as claimed in claim 1 wherein the frequency measuring means includes a variable band pass audio filter connected to said coincidence gate and an audio frequency meter connected to said audio filter.

3. An aircraft ground speed indicator having slant range measuring means as defined by claim 2 in which a ground speed computer is provided to receive the output of said frequency meter, and in which means are provided by which aircraft altitude and range data are imparted to said ground speed computer.

4. An aircraft ground speed indicator as defined by claim 3 in which a dial which is connected to said ground speed indicator is provided for visually indicating the aircraft ground speed as computed by said ground speed computer.

5. An aircraft ground speed indicator as defined in claim 3 wherein an air speed indicator is connected between said ground speed computer and said audio filter.

References Cited in the file of this patent

UNITED STATES PATENTS

| 2,422,064 | Anderson | June 10, 1947 |
| 2,455,639 | Anderson | Dec. 7, 1948 |
| 2,520,166 | Page | Aug. 29, 1950 |

FOREIGN PATENTS

| 656,094 | Great Britain | Aug. 15, 1951 |